(12) United States Patent
Lin

(10) Patent No.: US 11,953,127 B2
(45) Date of Patent: Apr. 9, 2024

(54) TELESCOPIC TUBE ASSEMBLY HAVING A FIXING STRUCTURE

(71) Applicant: Chien-Ting Lin, Santa Fe Springs, CA (US)

(72) Inventor: Chien-Ting Lin, Santa Fe Springs, CA (US)

( * ) Notice: Subject to any disclaimer, the term of this patent is extended or adjusted under 35 U.S.C. 154(b) by 0 days.

(21) Appl. No.: 17/454,141

(22) Filed: Nov. 9, 2021

(65) Prior Publication Data

US 2022/0146024 A1    May 12, 2022

(30) Foreign Application Priority Data

Nov. 9, 2020   (CN) .......................... 202022566897.8

(51) Int. Cl.
*F16L 27/12* (2006.01)
*F16L 37/14* (2006.01)
*F16L 37/18* (2006.01)

(52) U.S. Cl.
CPC ........... *F16L 27/127* (2019.08); *F16L 37/146* (2013.01); *F16L 37/18* (2013.01)

(58) Field of Classification Search
CPC .... F16B 7/1472; F16B 7/1454; F16B 7/0413; F16B 7/042; F16B 7/0406; F16L 27/127; F16L 37/146
See application file for complete search history.

(56) References Cited

U.S. PATENT DOCUMENTS

| | | | | |
|---|---|---|---|---|
| 1,220,648 | A * | 3/1917 | Leader | F16D 1/0847 280/93.509 |
| 2,842,387 | A * | 7/1958 | Clifford | F16B 7/1472 403/324 |
| 3,604,734 | A * | 9/1971 | Friedman | A47B 9/08 403/109.5 |
| 5,988,573 | A * | 11/1999 | Mueller | F16M 11/242 248/161 |
| 2010/0032541 | A1 * | 2/2010 | Chen | F16B 7/1472 248/527 |

FOREIGN PATENT DOCUMENTS

GB        778484 A  *  7/1957
WO   WO-8603562 A1 *  6/1986

* cited by examiner

*Primary Examiner* — Zachary T Dragicevich
*Assistant Examiner* — James A Linford
(74) *Attorney, Agent, or Firm* — Wang Law Firm, Inc.

(57) ABSTRACT

A telescopic tube assembly having a fixing structure, including: a first tube having at a receiving end offset toward a predetermined direction to form an inward offset arc portion and an outward arc portion opposite to each other; a second tube having an inserting end, wherein an inner diameter of the first tube is greater than an outer diameter of the second tube; and a fastening structure disposed at the receiving end of the first tube, wherein the inserting end of the second tube is inserted into the first tube through the receiving end; by locking the fastening structure, the second tube is pushed against the inward offset arc portion and fixed with the first tube; by loosening the fastening structure, the second tube is released from the inward offset arc portion and is movable relative to the first tube.

4 Claims, 20 Drawing Sheets

TELESCOPIC TUBE ASSEMBLY HAVING A FIXING STRUCTURE

CROSS-REFERENCE TO RELATED APPLICATION

This application claims the priority of Chinese patent application No. 202022566897.8, filed on Nov. 9, 2020, which is incorporated herewith by reference.

BACKGROUND OF THE INVENTION

1. Field of the Invention

The present invention relates to a telescopic tube assembly having a fixing structure, and more particularly, to a telescopic tube assembly having a fixing structure and being reshaped at an end of a tube.

2. The Prior Arts

In the existing telescopic tube assembly having a fixing structure, a sleeve is arranged at a connected portion of the inner and outer tubes of the telescopic tube assembly, that is, the sleeve is arranged around an outer wall of the outer tube at one end thereof. The sleeve has a fastening function. When the sleeve is locked, the inner and outer tubes are fixed and non-movable relative to each other. When the sleeve is loosened, the inner and outer tubes are movable relative to each other.

In addition, in the existing telescopic tube assembly, the inner tube is provided with a limit stop at one end thereof. The end of the inner tube provided with the limit stop is placed into the outer tube, and after the sleeve is sleeved around the telescopic tube assembly, the inner and outer tubes are movable relative to each other. When the inner tube is pulled outwardly, the limit stop of the inner tube is restricted by the sleeve such that the inner tube will not be separated from the outer tube. In addition to restricting the relative movement of the inner and outer tubes, the sleeve can also be fitted with the limit stop of the inner tube such that the inner tube and the outer tube will not be separated from each other.

However, in the cases that the existing telescopic tube assembly is applied to the central tube or the support leg tubes of a tripod, for example, when the existing telescopic tube assembly having a fixing structure is applied to a lightweight tripod, such fixing structure often causes the impossibility of reducing the folded size of the tripod, and also causes the impossibility of reducing the weight of the tripod, thereby reducing the portability in use. Alternatively, for example, when the existing telescopic tube assembly having a fixing structure is applied to a heavyweight tripod, metals are often used in such fixing structure. Due to the ambient temperature, in some areas, it is also needed to use metal material for the fixing structure; therefore, the tripod is too heavy and is inconvenient in carrying. Also, the insufficiently accurate manufacture often causes a friction between the fixing structure and the inner tube, thereby damaging the tripod. In addition, the manufacturing process for the telescopic tube assembly having a fixing structure made of metal relatively consumes manpower and resources.

SUMMARY OF THE INVENTION

In order to overcome the problem of the existing telescopic tube assembly having a fixing structure, the present invention provides a telescopic tube assembly having a fixing structure, wherein a receiving end of the first tube of the telescopic tube assembly is offset toward a predetermined direction to form an inward offset arc portion and an outward offset arc portion. A fastening structure is provided at a predetermined position of the outward offset arc portion. By locking the fastening structure, the second tube and the first tube are fixed with respect to each other. By loosening the fastening structure, the second tube and the first tube are movable relative to each other. The present invention can not only maintain the convenience in use, but also save the consumption of resources.

The technical solution of solving the above problems used by the present invention is to provide a telescopic tube assembly having a fixing structure, comprising a first tube, a second tube and a fastening structure. The first tube has a receiving end offset toward a predetermined direction to form an inward offset arc portion and an outward offset arc portion, which are opposite to each other. The inward offset arc portion is offset inwardly toward a center of the first tube by a first predetermined distance and the outward offset arc portion is offset outwardly toward the predetermined direction to a position beyond an outer edge of the first tube. The second tube has an inserting end, wherein an inner diameter of the first tube is greater than an outer diameter of the second tube. The fastening structure is disposed at the receiving end of the first tube. The inserting end of the second tube is inserted into the first tube through the receiving end; by locking the fastening structure, the second tube is pushed against the inward offset arc portion such that the second tube and the first tube are fixed with respect to each other; by loosening the fastening structure, the second tube is released from the inward offset arc portion such that the second tube and the first tube are movable relative to each other.

Preferably, the second tube is provided with a stopper at the inserting end, an outer diameter of the stopper is less than the inner diameter of the first tube and greater than the outer diameter of the second tube, and the second tube is movable in the first tube. When the first tube is pulled longitudinally and outwardly relative to the second tube, the stopper is restricted by the inward offset arc portion such that the second tube and the first tube are not separated from each other.

Preferably, the telescopic tube assembly comprises a position limiter for restricting a relative movement between the first tube and the second tube.

Preferably, the first tube is provided with a first open hole at a predetermined position of the outward offset arc portion, and the position limiter is placed between the outward offset arc portion and the second tube. The fastening structure includes a first nut and a first screw with a knob, the first nut is disposed between the position limiter and the outward offset arc portion, and the first screw with the knob is inserted through the first open hole to couple with the first nut. By locking the first screw with the knob, the position limiter is pressed by the first screw with the knob to push the second tube against the inward offset arc portion such that the second tube is clamped by the position limiter and the inward offset arc portion, thereby fixing the second tube and the first tube with respect to each other. By loosening the first screw with the knob, the second tube is released from the position limiter and the inward offset arc portion such that the second tube and the first tube are movable relative to each other.

Preferably, the first tube is provided with a second open hole at a predetermined position of the outward offset arc portion, and the position limiter is placed between the outward offset arc portion and the second tube. The fastening structure includes a first pin and an eccentric cam member. The position limiter is provided with an eccentric cam member receiving portion at a position corresponding to the second open hole, and the position limiter is provided with a first pin hole and a second pin hole at upper and lower sides of the eccentric cam member receiving portion, respectively. The eccentric cam member is placed into the eccentric cam member receiving portion through the second open hole, and the first pin is inserted into the first pin hole, a hole of the eccentric cam member and the second pin hole. By rotating the eccentric cam member to a locked position, the position limiter is pressed by the eccentric cam member to push the second tube against the inward offset arc portion such that the second tube is clamped by the position limiter and the inward offset arc portion, thereby fixing the second tube and the first tube with respect to each other. By rotating the eccentric cam member to a loosen position, the second tube is released from the position limiter and the inward offset arc portion such that the second tube and the first tube are movable relative to each other.

Preferably, the first tube is cut open and deformed outwardly at a predetermined position of the outward offset arc portion to form two parallel fixing wings; each of the two fixing wings is provided with a fixing hole, respectively. The fastening structure is a fastening assembly including a first fastener for penetrating through the two fixing holes and a second fastener for engaging with the first fastener. By locking the fastening assembly, the two fixing wings are close to each other to push the second tube against the inward offset arc portion such that the second tube and the first tube are fixed with respect to each other. By loosening the fastening assembly, the two fixing wings are away from each other and the second tube is released such that the second tube and the first tube are movable relative to each other.

Preferably, the first tube is provided with a sleeve around an outer edge of the receiving end, and the sleeve is provided with an opening or a notch at a predetermined position corresponding to the outward offset arc portion.

The telescopic tube assembly having a fixing structure according to the present invention can achieve the following advantageous effect. In the present invention, the receiving end of the first tube is offset toward a predetermined direction to form an inward offset arc portion and an outward offset arc portion. A fastening structure is provided at a predetermined position of the outward offset arc portion. By locking the fastening structure, the second tube and the first tube are fixed with respect to each other. By loosening the fastening structure, the second tube and the first tube are movable relative to each other. The present invention can not only maintain the convenience in use, but also save the consumption of resources.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Hereinafter, the embodiments of the present invention will be described with reference to FIGS. 1A to 7C. This illustration is not intended to limit the embodiments of the present invention, but belongs to one of the embodiments of the present invention.

Figure 1A:
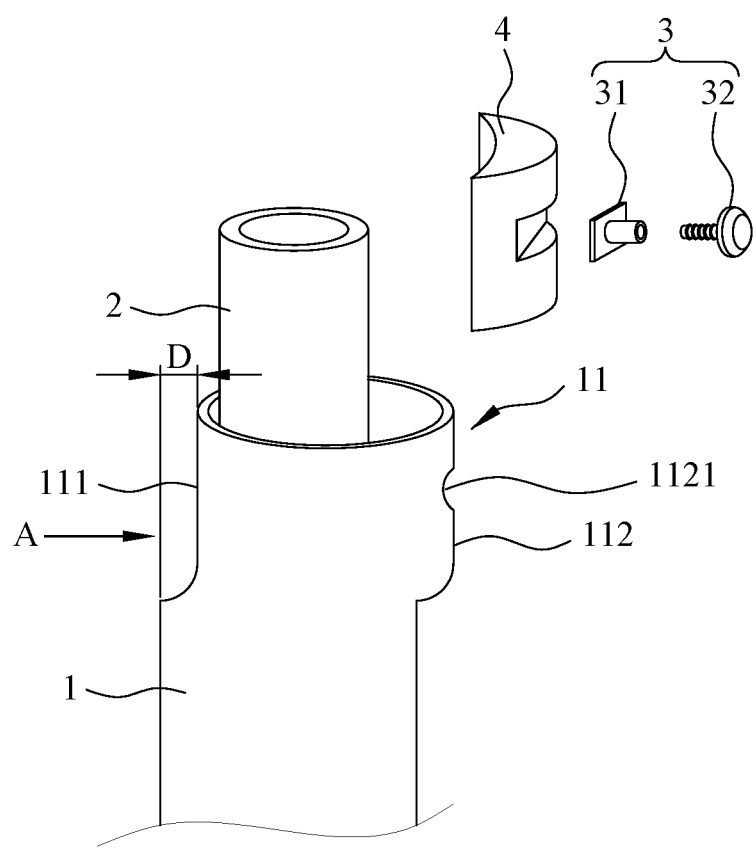
FIG. 1A is an exploded schematic view according to the first embodiment of the present invention.
Figure 1B:
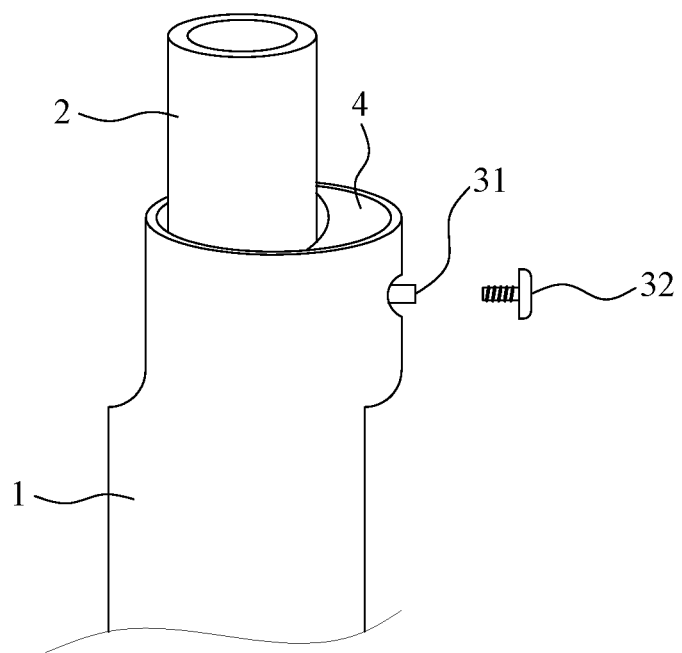
FIG. 1B is a schematic view showing a loosen state according to the first embodiment of the present invention.
Figure 1C:
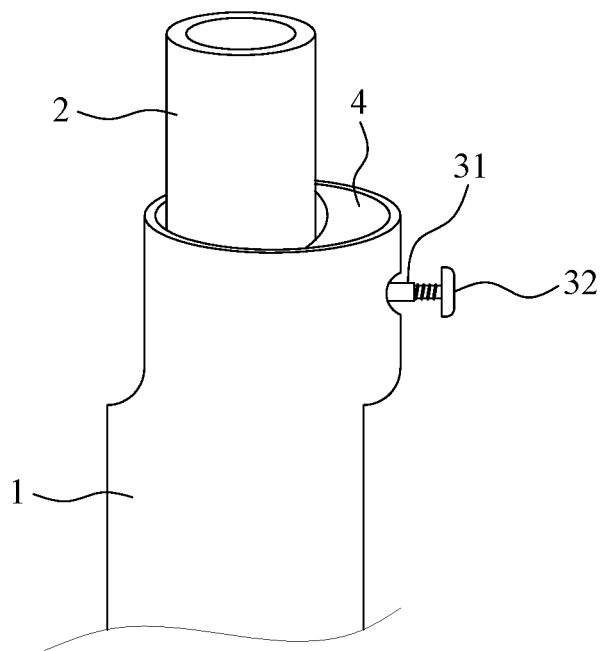
FIG. 1C is a schematic view showing a locked state according to the first embodiment of the present invention.

As shown in FIGS. 1A to 1C, a telescopic tube assembly having a fixing structure according to the first embodiment of the present invention comprises a first tube 1, a second tube 2 and a fastening structure 3. The first tube 1 has an integrally-formed receiving end 11. The receiving end 11 of the first tube 1 is offset toward a transverse direction A relative to a center line of the first tube to form an inward offset arc portion 111 and an outward offset arc portion 112 in the receiving end relative to the first tube, which are opposite to each other at a same height level of the center line of the first tube. The inward offset arc portion 111 is offset inwardly toward the center line of the first tube 1 by a first predetermined distance D such that the inward offset arc portion is positioned between the center line and an outer edge of the first tube, and the outward offset arc portion 112 is offset outwardly toward the transverse direction A to a position beyond the outer edge of the first tube 1. An inner diameter of the first tube 1 is greater than an outer diameter of the second tube 2. The second tube 2 has an inserting end 21. The fastening structure 3 is disposed at the receiving end 11 of the first tube 1. Wherein, the inserting end 21 of the second tube 2 is inserted into the first tube 1 through the receiving end 11. By locking the fastening structure 3, the second tube 2 is pushed against the inward offset arc portion 111 such that the second tube 2 and the first tube 1 are fixed with respect to each other. By loosening the fastening structure 3, the second tube 2 is released from the inward offset arc portion 111 such that the second tube 2 and the first tube 1 are movable relative to each other. It can be seen that in the present invention, a novel telescopic tube assembly having a fixing structure can be implemented by deforming the receiving end 11 of the first tube 1 to form the inward offset arc portion 111 and the outward offset arc portion 112 opposite to each other.

Figure 2A:
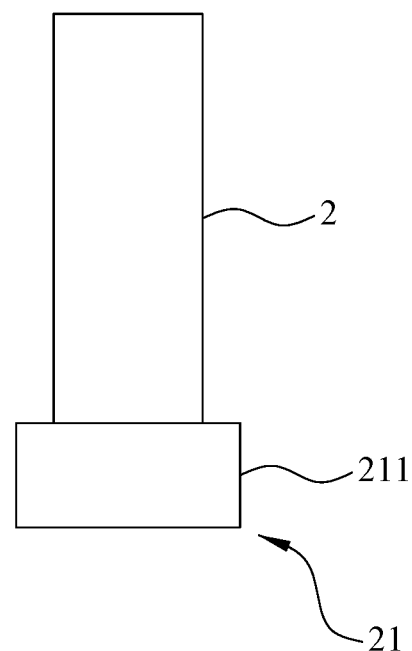
FIG. 2A is a schematic view of the second tube according to the second embodiment of the present invention.
Figure 2B:
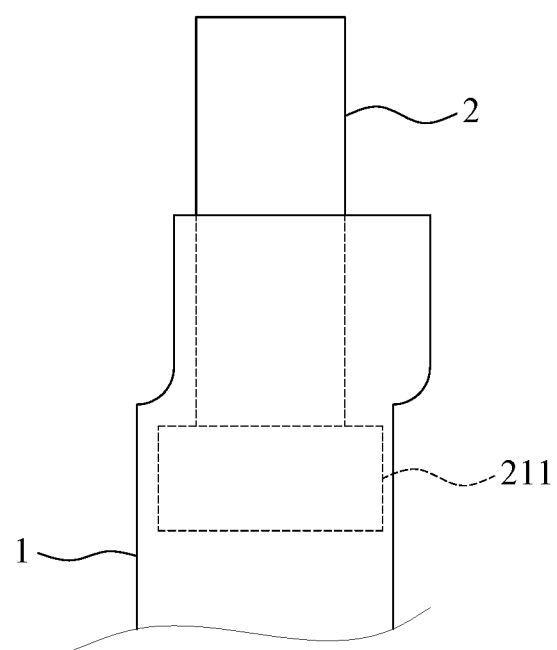
FIG. 2B is a schematic view showing the assembling of the first tube and the second tube according to the second embodiment of the present invention.

As shown in FIGS. 2A to 2B, which show a telescopic tube assembly having a fixing structure according to the second embodiment of the present invention, the second tube 2 is provided with a stopper 211 at the inserting end 21. An outer diameter of the stopper 211 is less than the inner diameter of the first tube 1 and greater than the outer diameter of the second tube 2. The second tube 2 is movable in the first tube 1. When the first tube 1 is pulled longitudinally and outwardly relative to the second tube 2, the stopper 211 is restricted by the inward offset arc portion 111 such that the second tube 2 and the first tube 1 are not separated from each other. In this embodiment, the first tube 1 and the second tube 2 can be avoided from being separated from each other during the longitudinal extension of the telescopic tube assembly.

As shown in FIGS. 1A to 1C, 3A to 3C, 5A to 5C, 6A to 6C and 7A to 7C, which respectively show the telescopic tube assemblies having a fixing structure according to the first, third and fifth to seventh embodiments of the present invention, each telescopic tube assembly having a fixing structure further comprises a position limiter 4.

Please refer to FIGS. 1A to 1C, which show the telescopic tube assembly having a fixing structure according to the first embodiment of the present invention. As shown in FIG. 1A, the first tube 1 is provided with a first open hole 1121 at a predetermined position of the outward offset arc portion 112, and the position limiter 4 is placed between the outward offset arc portion 112 and the second tube 2. The fastening structure 3 includes a first nut 31 and a first screw with a knob 32. The first nut 31 is disposed between the position limiter 4 and the outward offset arc portion 112, and the first screw with the knob 32 is inserted through the first open hole 1121 to couple with the first nut 31. As shown in FIGS. 1B and 1C, by locking the first screw with the knob 32, the position limiter 4 is pressed by the first screw with the knob 32 to push the second tube 2 against the inward offset arc portion 111 such that the second tube 2 is clamped by the position limiter 4 and the inward offset arc portion 111, thereby fixing the second tube 2 and the first tube 1 with respect to each other. By loosening the first screw with the knob 32, the second tube 2 is released from the position limiter 4 and the inward offset arc portion 111 such that the second tube 2 and the first tube 1 are movable relative to each other.

Figure 3A:
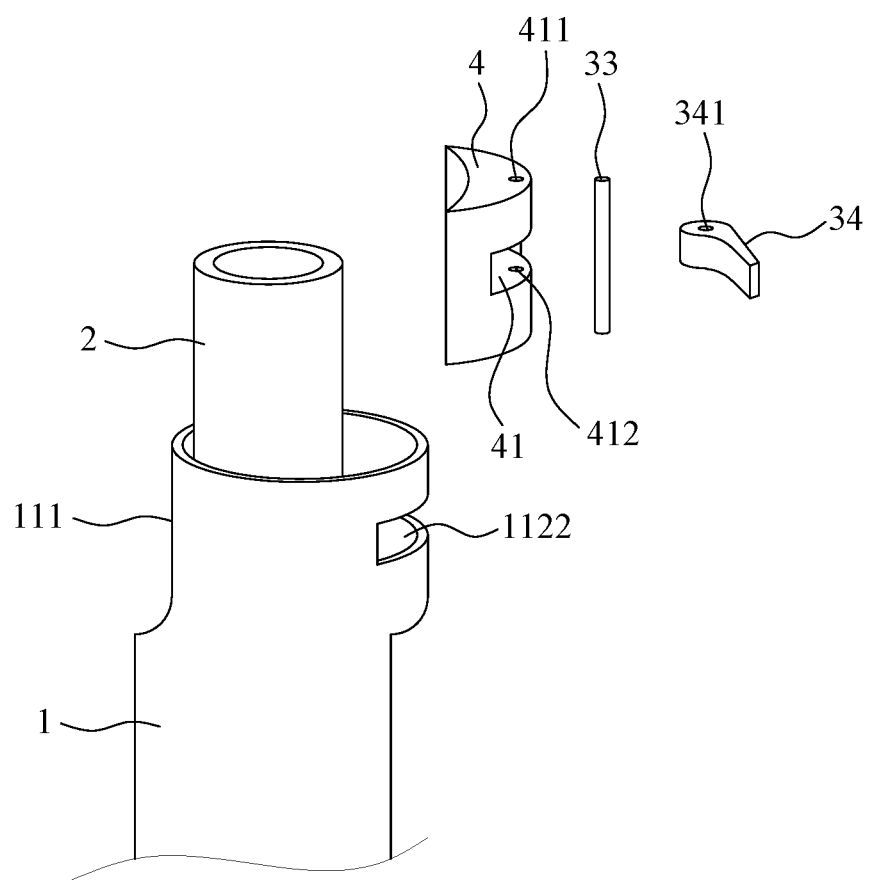
FIG. 3A is an exploded schematic view according to the third embodiment of the present invention.
Figure 3B:
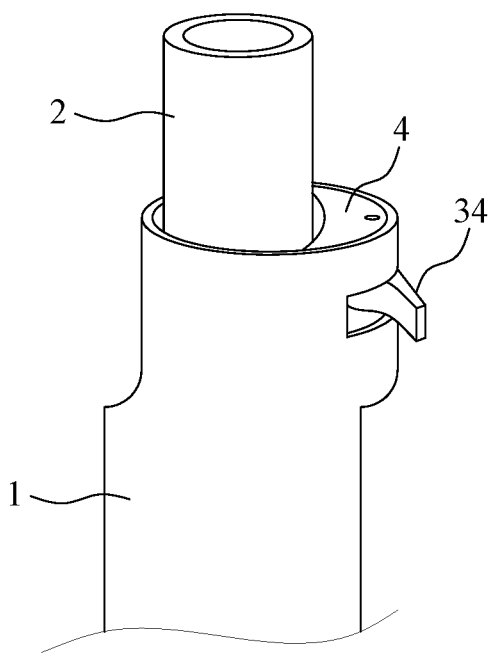
FIG. 3B is a schematic view showing a loosen state according to the third embodiment of the present invention.
Figure 3C:
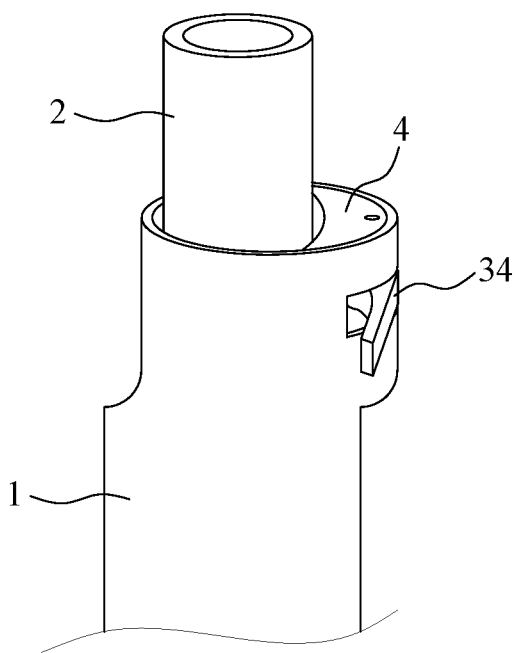
FIG. 3C is a schematic view showing a locked state according to the third embodiment of the present invention.

Please refer to FIGS. 3A to 3C, which show a telescopic tube assembly having a fixing structure according to the third embodiment of the present invention. As shown in FIG. 3A, the first tube 1 is provided with a second open hole 1122 at a predetermined position of the outward offset arc portion 112, and the position limiter 4 is placed between the outward offset arc portion 112 and the second tube 2. The fastening structure 3 includes a first pin 33 and an eccentric cam member 34. The position limiter 4 is provided with an eccentric cam member receiving portion 41 at a position corresponding to the second open hole 1122. The position limiter 4 is provided with a first pin hole 411 and a second pin hole 412 at upper and lower sides of the eccentric cam member receiving portion 41, respectively. The eccentric cam member 34 is placed into the eccentric cam member receiving portion 41 through the second open hole 1122, and the first pin 33 is inserted into the first pin hole 411, a hole 341 of the eccentric cam member 34 and the second pin hole 412. As shown in FIGS. 3B and 3C, by rotating the eccentric cam member 34 to a locked position, the position limiter 4 is pressed by the eccentric cam member 34 to push the second tube 2 against the inward offset arc portion 111 such that the second tube 2 is clamped by the position limiter 4 and the inward offset arc portion 111, thereby fixing the second tube 2 and the first tube 1 with respect to each other. By rotating the eccentric cam member 34 to a loosen position, the second tube 2 is released from the position limiter 4 and the inward offset arc portion 111 such that the second tube 2 and the first tube 1 are movable relative to each other.

Figure 4A:
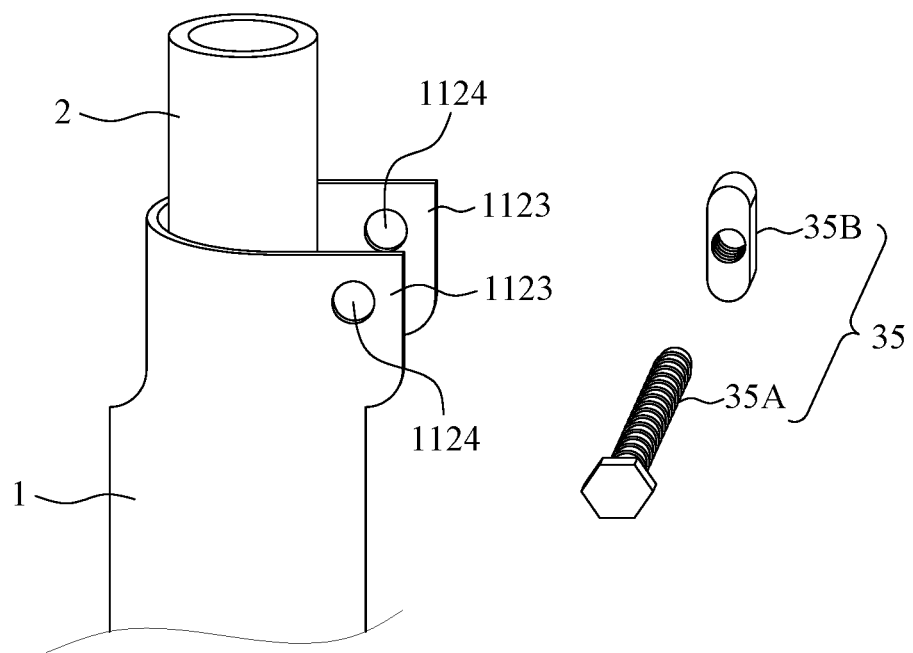
FIG. 4A is an exploded schematic view according to the fourth embodiment of the present invention.
Figure 4B:
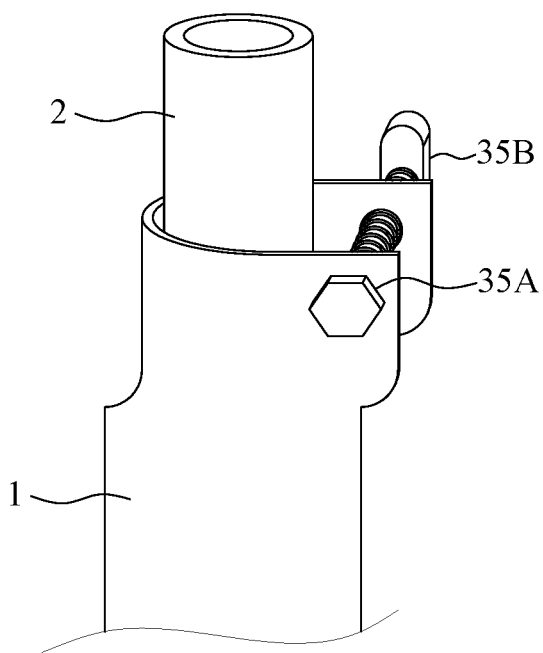
FIG. 4B is a schematic view showing a loosen state according to the fourth embodiment of the present invention.
Figure 4C:
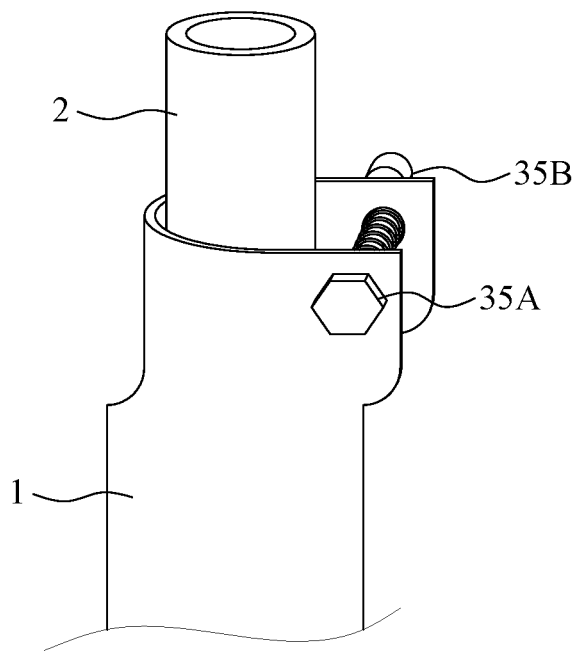
FIG. 4C is a schematic view showing a locked state according to the fourth embodiment of the present invention.

Please refer to FIGS. 4A to 4C, which show a telescopic tube assembly having a fixing structure according to the fourth embodiment of the present invention. The first tube 1 is cut open and deformed outwardly at a predetermined position of the outward offset arc portion 112 to form two parallel fixing wings 1123. Each of the two fixing wings 1123 is provided with a fixing hole 1124, respectively. The fastening structure 3 is a fastening assembly 35 including a first fastener 35A for penetrating through the two fixing holes 1124 and a second fastener 35B for engaging with the first fastener 35A. By locking the fastening assembly 35, the two fixing wings 1123 are close to each other to push the second tube 2 against the inward offset arc portion 111 such that the second tube 2 and the first tube 1 are fixed with respect to each other. By loosening the fastening assembly 35, the two fixing wings 1123 are away from each other and the second tube 2 is released such that the second tube 2 and the first tube 1 are movable relative to each other. This embodiment may also be in cooperation with the above-mentioned position limiter 4.

As shown in FIGS. 5A to 5C, FIGS. 6A to 6C, and FIGS. 7A to 7C, which show telescopic tube assemblies having a fixing structure according to the fifth to seventh embodiments of the present invention, a sleeve 5 is sleeved around an outer edge of the receiving end 11 of the first tube 1. The sleeve 5 is provided with an opening 51 or a notch 53 at a predetermined position corresponding to the outward offset arc portion 112. In these embodiments, an outer diameter of the sleeve 5 may be kept close to an outer diameter of the first tube 1. When such structure is applied to a tripod with reversed-folded support leg tubes, the overall storage volume can be reduced.

Figure 5A:
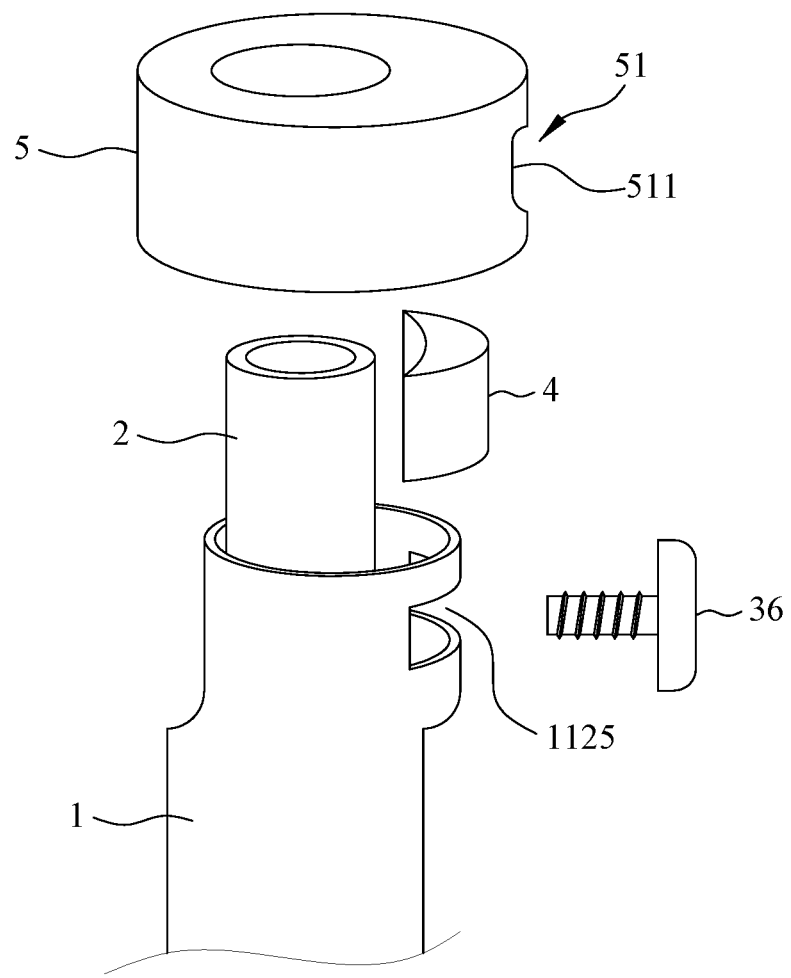
FIG. 5A is an exploded schematic view according to the fifth embodiment of the present invention.
Figure 5B:
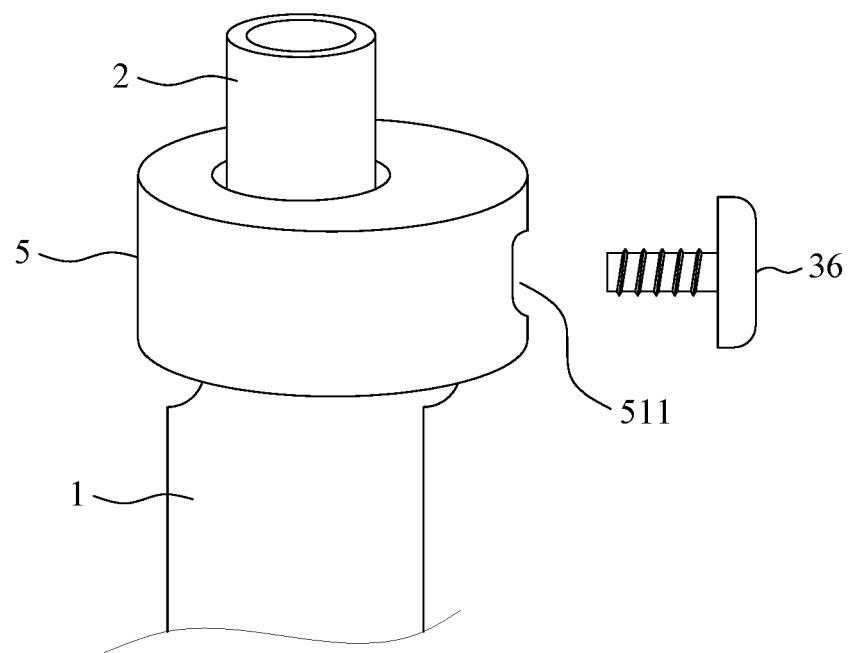
FIG. 5B is a schematic view showing a loosen state according to the fifth embodiment of the present invention.
Figure 5C:
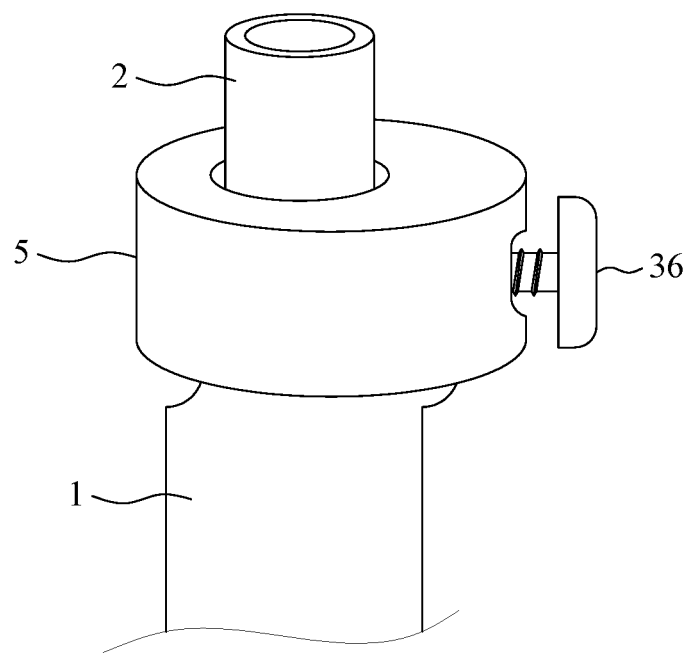
FIG. 5C is a schematic view showing a locked state according to the fifth embodiment of the present invention.

Please refer to FIGS. 5A to 5C, which show the telescopic tube assembly having a fixing structure according to the fifth embodiment of the present invention. As shown in FIG. 5A, the first tube 1 is provided with a third open hole 1125 at a predetermined position of the outward offset arc portion 112, and the position limiter 4 is placed between the outward offset arc portion 112 and the second tube 2. The sleeve 5 is sleeved around the outer wall of the inward offset arc portion 111 and the outward offset arc portion 112. The sleeve 5 is provided with an opening 51 at a position corresponding to the third open hole 1125. The opening 51 is a fastener hole 511, and the fastening structure 3 is a second screw with a knob 36. The second screw with the knob 36 penetrates into the sleeve 5 and the third open hole 1125 via the fastener hole 511. As shown in FIGS. 5B and 5C, by locking the second screw with the knob 36, the position limiter 4 is pressed by the second screw with the knob 36 to push the second tube 2 against the inward offset arc portion 111 such that the second tube 2 is clamped by the position limiter 4 and the inward offset arc portion 111, thereby fixing the second tube 2 and the first tube 1 with respect to each other. By loosening the second screw with the knob 36, the second tube 2 is released from the position limiter 4 and the inward offset arc portion 111 such that the second tube 2 and the first tube 1 are movable relative to each other.

Figure 6A:
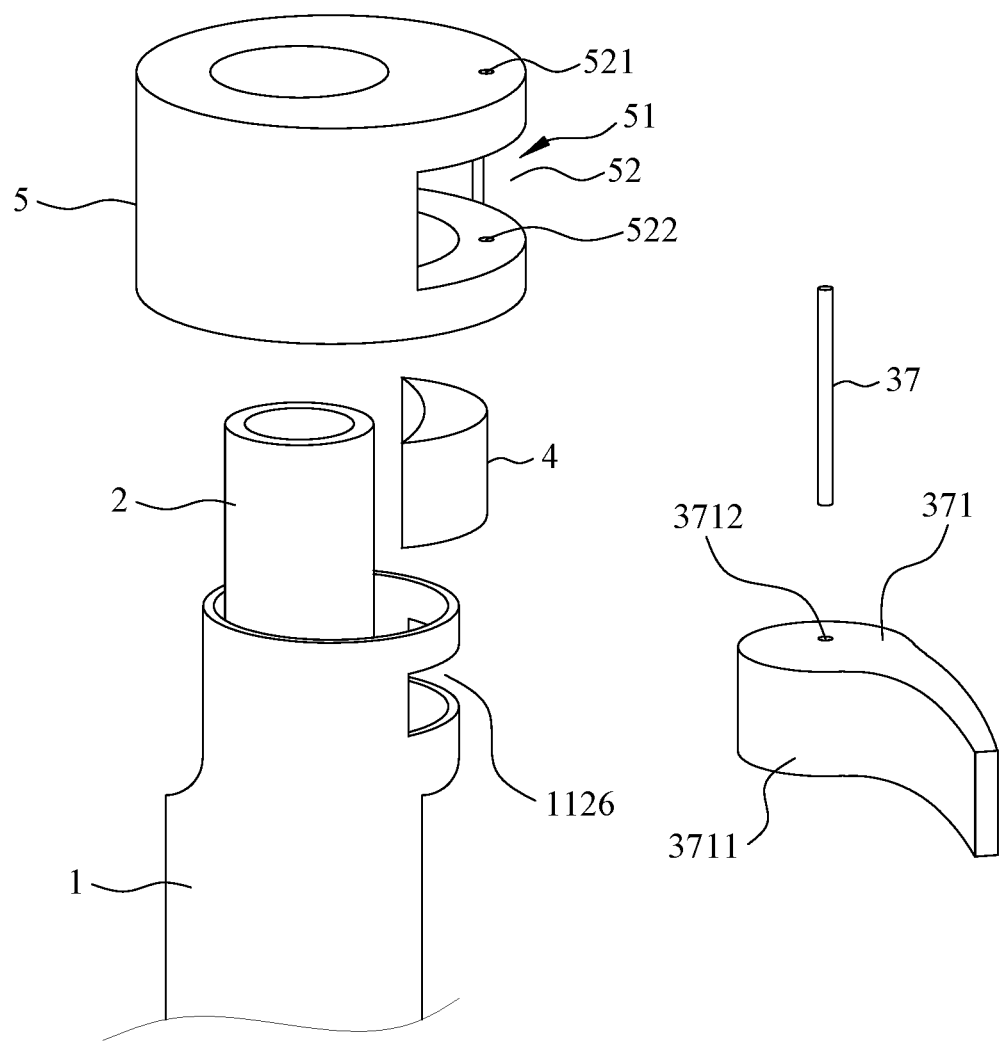
FIG. 6A is an exploded schematic view according to the sixth embodiment of the present invention.
Figure 6B:
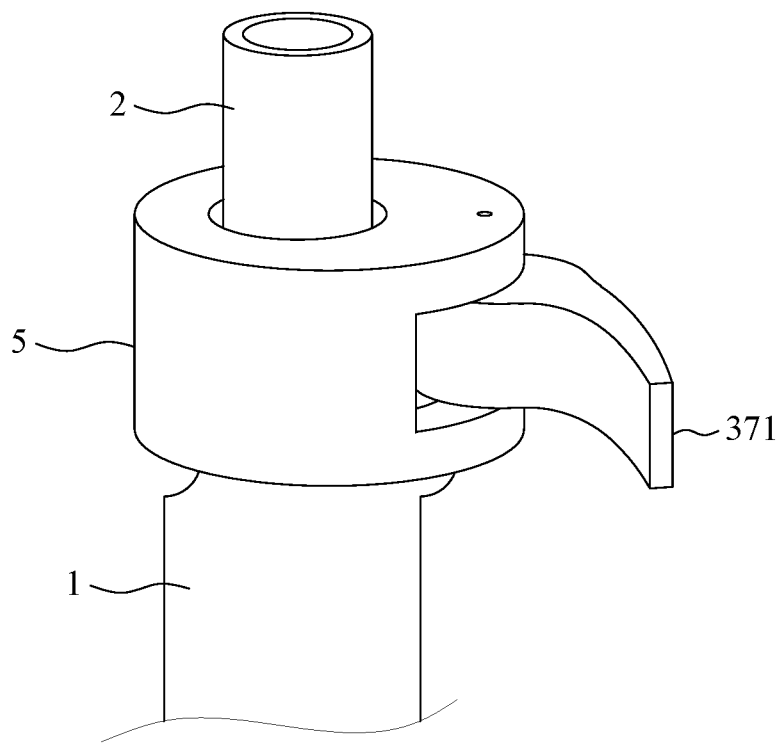
FIG. 6B is a schematic view showing a loosen state according to the sixth embodiment of the present invention.
Figure 6C:
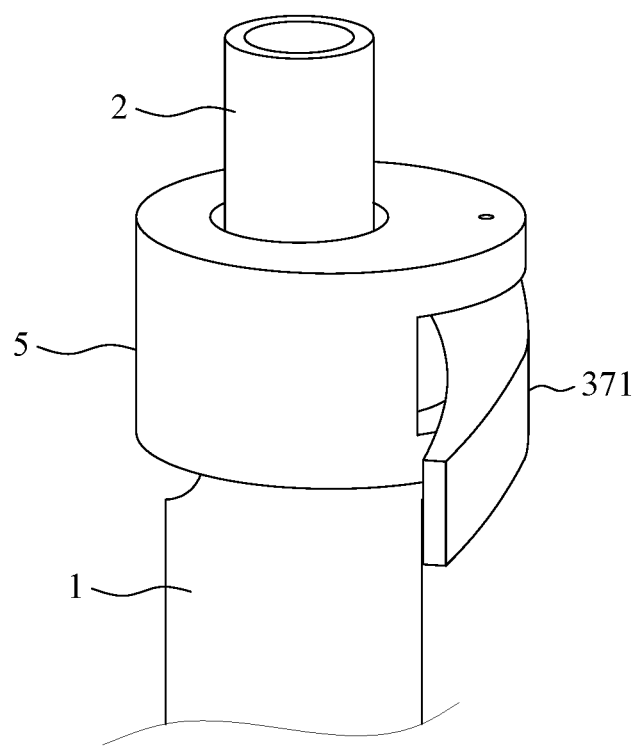
FIG. 6C is a schematic view showing a locked state according to the sixth embodiment of the present invention.

Please refer to FIGS. 6A to 6C, which show the telescopic tube assembly having a fixing structure according to the sixth embodiment of the present invention. As shown in FIG. 6A, the first tube 1 is provided with a fourth open hole 1126 at a predetermined position of the outward offset arc portion 112, and the position limiter 4 is placed between the outward offset arc portion 112 and the second tube 2. The sleeve 5 is sleeved around the outer wall of the inward offset arc portion 111 and the outward offset arc portion 112. The sleeve 5 is provided with the opening 51 at a position corresponding to the fourth open hole 1126. The opening 51 is a horizontal cam member receiving portion 52. The sleeve 5 is provided with a third pin hole 521 and a fourth pin hole 522 at the upper and lower sides of the opening 51, respectively. The fastening structure 3 includes a second pin 37 and a horizontal cam member 371. The horizontal cam member 371 is provided with a cam portion 3711 at one end thereof. The cam portion 3711 of the horizontal cam member 371 is placed into the horizontal cam member receiving portion 52, and then the second pin 37 penetrates into the third pin hole 521, a hole 3712 of the horizontal cam member 371, and the fourth pin hole 522. As shown in FIGS. 6B and 6C, by locking the horizontal cam member 371, the position limiter 4 is pressed by the horizontal cam member 371 to push the second tube 2 against the inward offset arc portion 111 such that the second tube 2 is clamped by the position limiter 4 and the inward offset arc portion 111, thereby fixing the second tube 2 and the first tube 1 with respect to each other. By loosening the horizontal cam member 371, the second tube 2 is released from the position limiter 4 and the inward offset arc portion 111 such that the second tube 2 and the first tube 1 are movable relative to each other.

Figure 7A:
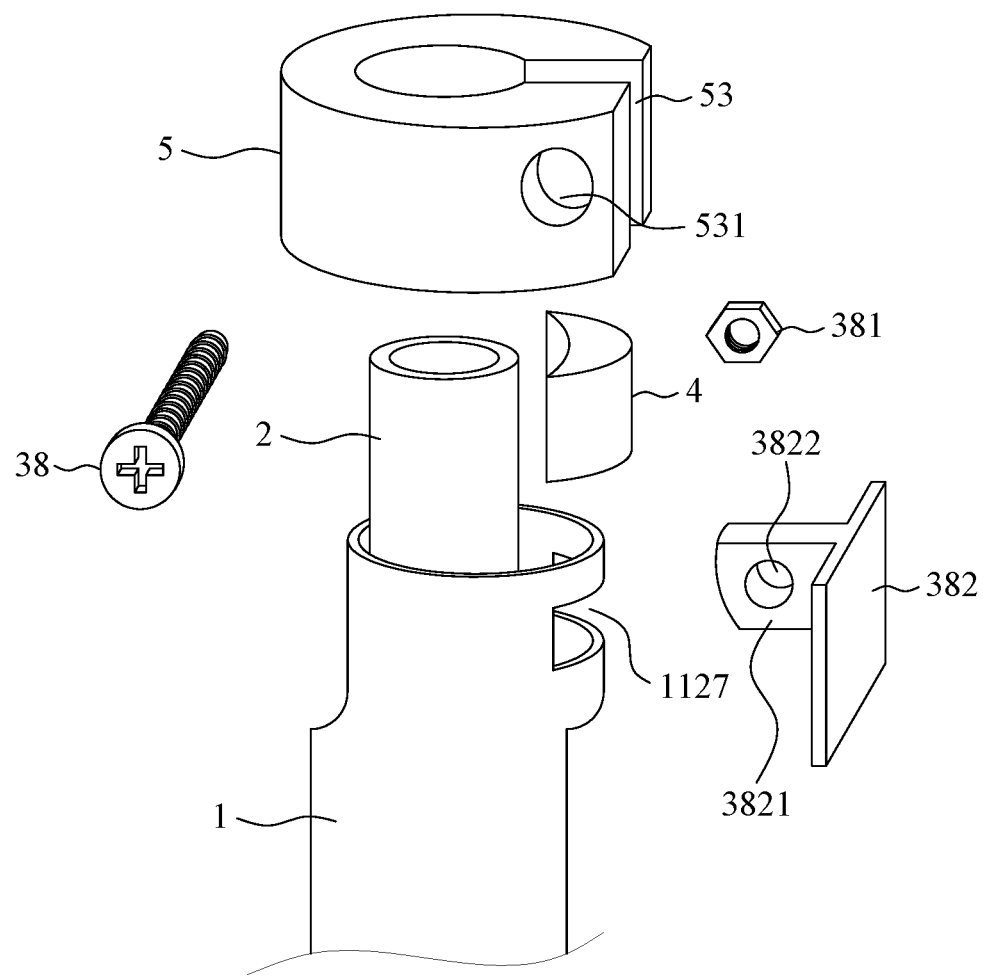
FIG. 7A is an exploded schematic view according to the seventh embodiment of the present invention.
Figure 7B:
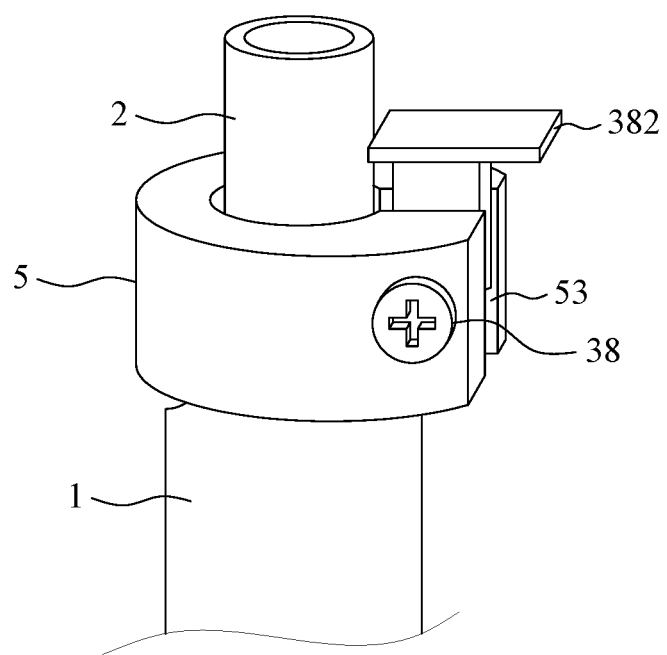
FIG. 7B is a schematic view showing a loosen state according to the seventh embodiment of the present invention.
Figure 7C:
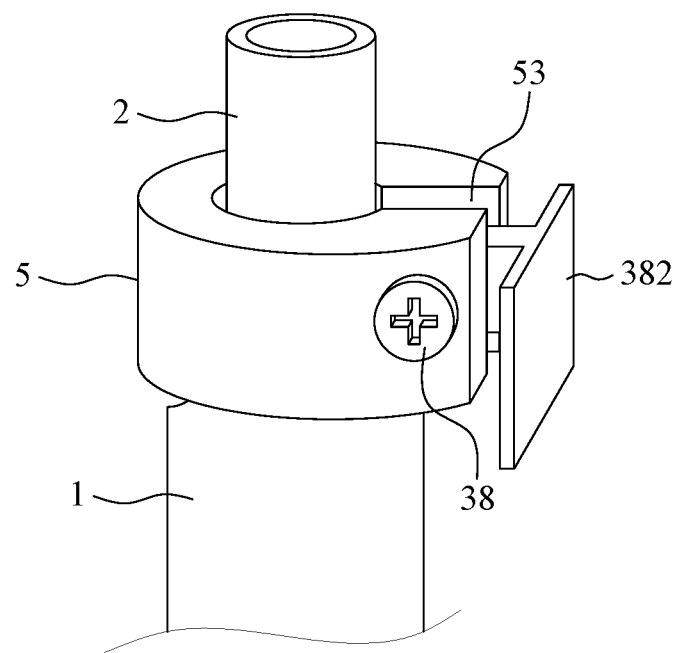
FIG. 7C is a schematic view showing a locked state according to the seventh embodiment of the present invention.

Please refer to FIGS. 7A to 7C, which show the telescopic tube assembly having a fixing structure according to the seventh embodiment of the present invention. As shown in FIG. 7A, the first tube 1 is provided with a fifth open hole 1127 at a predetermined position of the outward offset arc portion 112, and the position limiter 4 is placed between the outward offset arc portion 112 and the second tube 2. The sleeve 5 is sleeved around the outer wall of the inward offset arc portion 111 and the outward offset arc portion 112. The sleeve 5 is provided with a notch 53 at a position corresponding to the fifth open hole 1127. A perforation 531 is provided on each of both sides of the notch 53 of the sleeve 5, respectively. The fastening structure 3 includes a third screw 38, a third nut 381, and a vertical cam member 382. The vertical cam member 382 is provided with a cam portion 3821 at one end thereof. The cam portion 3821 of the vertical cam member 382 is placed into the notch 53, and the third screw 38 sequentially penetrates one of the perforations 531, a hole 3822 of the vertical cam member 382, and the other of the perforations 531 and then is coupled with the third nut 381. As shown in FIGS. 7B and 7C, by locking the vertical cam member 382, the position limiter 4 is pressed by the vertical cam member 382 to push the second tube 2 against the inward offset arc portion 111 such that the second tube 2 is clamped by the position limiter 4 and the inward offset arc portion 111, thereby fixing the second tube 2 and the first tube 1 with respect to each other. By loosening the vertical cam member 382, the second tube 2 is released from the position limiter 4 and the inward offset arc portion 111 such that the second tube 2 and the first tube 1 are movable relative to each other.

The telescopic tube assembly of the present invention can be applied in a wide range of field including, but not limited to, the central tube and the support leg tubes of a tripod.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A telescopic tube assembly having a fixing structure, comprising:
    a first tube having a monolithically-formed cylindrical receiving end offset toward a transverse direction relative to a center line of the first tube to form an inward offset arc portion and an outward offset arc portion in the receiving end relative to the first tube, which are opposite to each other at a same height level of the center line of the first tube, wherein the inward offset arc portion is offset inwardly toward the center line of the first tube by a first predetermined distance such that the inward offset arc portion is positioned between the center line and an outer edge of the first tube, and the outward offset arc portion is offset outwardly toward the transverse direction to a position beyond the outer edge of the first tube;
    a second tube having an inserting end, wherein an inner diameter of the first tube is greater than an outer diameter of the second tube; and
    a fastening structure disposed within the receiving end of the first tube,
    wherein the inserting end of the second tube is inserted into the first tube through the receiving end; by locking the fastening structure, the second tube is pushed against the inward offset arc portion such that the second tube and the first tube are fixed with respect to each other; by loosening the fastening structure, the second tube is released from the inward offset arc portion such that the second tube and the first tube are movable relative to each other.

2. The telescopic tube assembly according to claim 1, further comprising a position limiter for restricting a relative movement between the first tube and the second tube.

3. The telescopic tube assembly according to claim 2, wherein the first tube is provided with a first open hole at a predetermined position of the outward offset arc portion, and the position limiter is placed between the outward offset arc portion and the second tube; the fastening structure includes a first nut and a first screw with a knob, the first nut is disposed between the position limiter and the outward offset arc portion, and the first screw with the knob is inserted through the first open hole to couple with the first nut; by locking the first screw with the knob, the position limiter is pressed by the first screw with the knob to push the second tube against the inward offset arc portion such that the second tube is clamped by the position limiter and the inward offset arc portion, thereby fixing the second tube and the first tube with respect to each other; by loosening the first screw with the knob, the second tube is released from the position limiter and the inward offset arc portion such that the second tube and the first tube are movable relative to each other.

4. The telescopic tube assembly according to claim 1, wherein the first tube is provided with a sleeve around an outer edge of the receiving end, and the sleeve is provided with an opening or a notch at a predetermined position corresponding to the outward offset arc portion.

\* \* \* \* \*